United States Patent [19]
Coulter et al.

[11] 3,991,859
[45] Nov. 16, 1976

[54] ADJUSTING MECHANISM FOR A DISC BRAKE CALIPER ASSEMBLY

[75] Inventors: James L. Coulter, Fraser; Harald H. Lorenz, Bloomfield Hills, both of Mich.

[73] Assignee: General Motors Corporation, Detroit, Mich.

[22] Filed: Feb. 27, 1976

[21] Appl. No.: 662,220

[52] U.S. Cl. ............................ 188/71.9; 188/72.7; 188/106 F; 188/196 F
[51] Int. Cl.² ......................................... F16D 65/56
[58] Field of Search ................ 188/71.8, 71.9, 72.7, 188/72.8, 106 F, 106 P, 196 F; 192/111 A

[56] References Cited
UNITED STATES PATENTS

| | | | |
|---|---|---|---|
| 3,243,016 | 3/1966 | Swift | 188/71.9 |
| 3,590,964 | 7/1971 | Krause | 188/196 F |
| 3,638,763 | 2/1972 | Laverdant | 188/71.9 |
| 3,820,635 | 6/1974 | Hunt | 188/71.9 |
| 3,920,103 | 11/1975 | Haraikawa | 188/71.9 |

FOREIGN PATENTS OR APPLICATIONS

| | | | |
|---|---|---|---|
| 1,279,706 | 6/1972 | United Kingdom | 188/196 F |

*Primary Examiner*—Trygve M. Blix
*Assistant Examiner*—Edward R. Kazenske
*Attorney, Agent, or Firm*—D. D. McGraw

[57] ABSTRACT

A disc brake actuating and adjusting mechanism including both hydraulic actuation for service brake operation and mechanical actuation for parking brake operation. The brake apply mechanism is separated from the adjuster mechanism and a ball ramp arrangement is utilized for parking brake actuation. Adjustment is maintained by a spring motor driving an adjusting nut. Brake release results in a net motion of the bolt on which the nut is threaded, separating the nut and the ball ramp output member at a clutch face. The spring motor then runs the nut on the bolt until the clutch face is again tightly engaged. When the brake is mechanically applied, the clutch face is loaded to prevent adjustment. The same lockout arrangement prevents adjusting nut rotation during hydraulic apply.

2 Claims, 3 Drawing Figures

U.S. Patent  Nov. 16, 1976  3,991,859
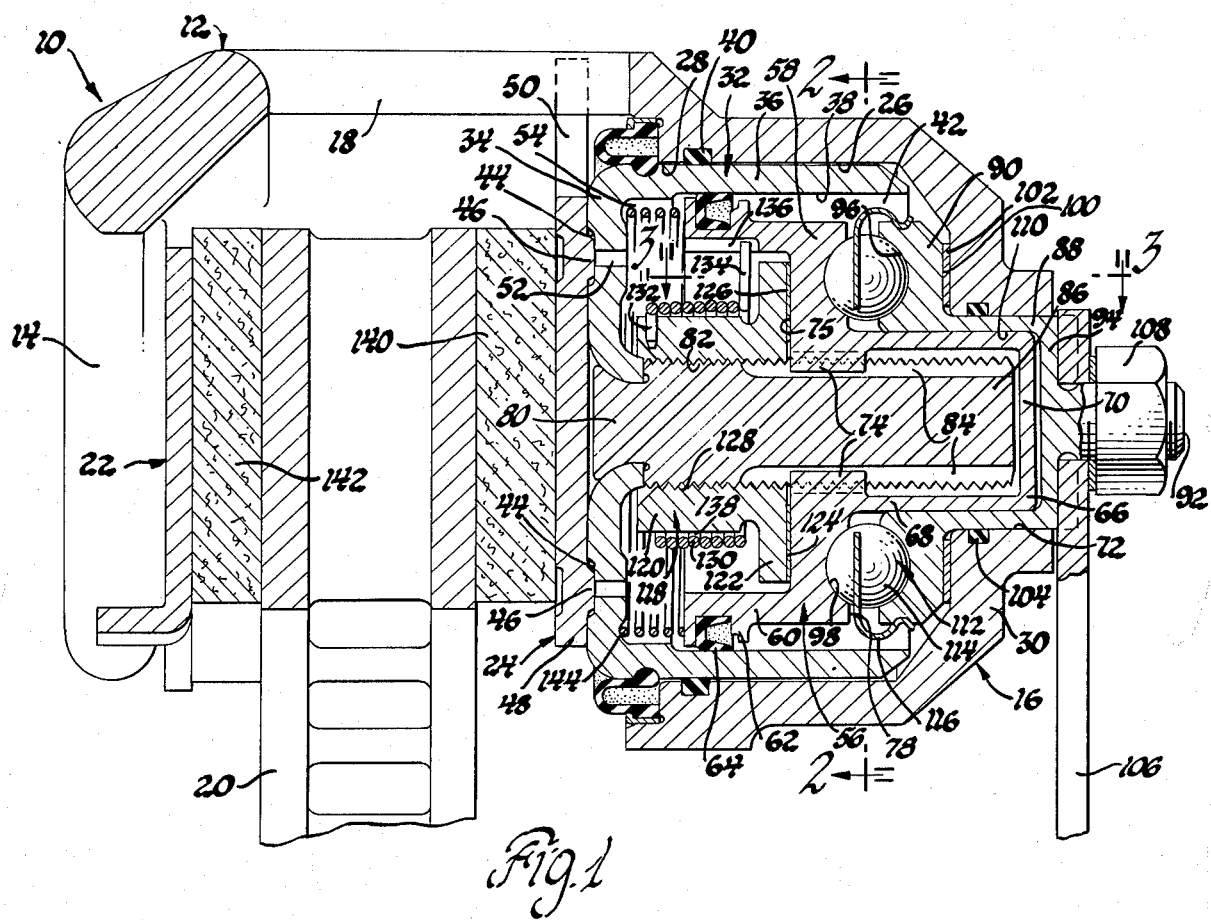

ADJUSTING MECHANISM FOR A DISC BRAKE CALIPER ASSEMBLY

The invention relates to a disc brake and more particularly to one having an actuating and adjusting mechanism for hydraulic and mechanical actuation on a selective basis, with adjustment occurring upon brake release when appropriate. The mechanical apply mechanism is separated from the adjuster mechanism.

The actuating portion of the caliper includes an actuating cylinder with an outer piston movable in the cylinder and actuating one brake pad assembly. An extension forming a bolt and adjusting mechanism support member is either integrally formed with or securely attached to the outer piston and extends within the actuating cylinder in a direction away from the brake pad assembly. An inner piston is contained within the cylinder formed by the skirt of the outer piston and is reciprocably movable therein relative to the outer piston. It is also mounted by a key and keyway arrangement on the support so that it cannot rotate relative to the outer piston. The outer piston is prevented from rotation by a suitable connection to the brake pad assembly. An adjusting nut is threaded on the support member axially intermediate the inner and outer pistons and has an end surface cooperating with a portion of the inner piston to define a friction clutch. A spring motor is provided by a torsion spring having one end connected to the adjusting nut and the other end connected to the inner piston. The inner piston also includes ball ramp surfaces arranged to cooperate with several balls for a high mechanical ratio parking brake actuator. The other ramp surfaces cooperating with the balls are positioned so that they transmit thrust to the end wall of the actuating cylinder defined by the disc brake housing. It also extends through a bore in the end wall and has a brake lever arm attached thereto. A suitable linkage permits the vehicle operator to rotate the brake lever arm to mechanically actuate the disc brake assembly for parking brake purposes.

When the brake is mechanically applied, the balls apply axial force to the inner piston so as to tightly engage the clutch, locking the adjusting nut and the inner piston together to eliminate the possibility of brake adjustment during brake application, thereby eliminating over-adjustment. If the brake pad has had sufficient wear to require adjustment, the spring motor will rotate the adjusting nut after brake apply force has been released and will cause the nut to move axially as well as rotatably on the support member until the gap between the adjusting nut and the inner piston, occurring upon brake release, has been taken up.

During hydraulic brake actuation, hydraulic pressure acts on both the inner and outer pistons, also tightly engaging the clutch with a similar result. By moving the support member with the outer piston, there is no relative axial movement of the inner and outer pistons and the adjusting nut, and the mechanical actuating portion of the brake mechanism is not contained in the flow of hydraulic brake force application.

IN THE DRAWING

FIG. 1 is a cross-section view of a disc brake assembly including the invention and having parts broken away.

FIG. 2 is a section view taken in the direction of arrows 2—2 of FIG. 1.

FIG. 3 is a fragmentary sectional view particularly illustrating a portion of the ball ramp actuating mechanism and taken in the direction of arrows 3—3 of FIG. 1.

The disc brake caliper assembly 10 includes a disc brake actuating and adjusting mechanism. The caliper assembly generally includes a caliper frame 12 having legs 14 and 16 joined by a bridge section 18 which extends across the outer periphery of the disc 20 to be braked. Brake pad assemblies 22 and 24 are positioned on opposite sides of the disc and between the caliper frame legs for friction braking engagement with the disc when the brake is actuated. The leg 16 contains the brake actuating and adjusting mechanism. This type of brake is commonly utilized in a sliding caliper mounting arrangement so that when the brake is actuated, the brake pad assembly adjacent the actuating mechanism moves into braking engagement with one side of the disc. Reaction to the actuating movement slides the caliper frame so as to move the other brake pad assembly 22 into friction braking engagement with the other side of the disc. The arrangement can also be utilized in swing calipers which pivot rather than slide.

Leg 16 has an actuating cylinder 26 formed therein with an opening 28 adjacent the brake pad assembly 24 and an end wall 30 at the outer end of the cylinder. A generally cup-shaped outer piston 32 is reciprocably received in actuating cylinder 26. The piston has a head or end wall 34 and a skirt 36. The outer surface of skirt 36 fits the wall of actuating cylinder 26 and the inner surface is formed to provide a cylinder 38. A seal 40 effectively prevents fluid from leaking out of the hydraulic pressurizing chamber 42 between piston skirt 36 and cylinder 26. Seal 40 is illustrated as being mounted in a seal groove formed in the wall of actuating cylinder 26 adjacent opening 28. The hydraulic pressurizing chamber 42 is defined at least in part by cylinder 26 and the end of piston skirt 36. The outer surface of the piston head 34 is provided with suitable recesses 44 which receive buttons 46 formed on the shoe 48 of brake pad assembly 24. Shoe 48 has end fingers 50 which extend radially outwardly on either side of the bridge section 18 of the caliper frame. They are slidably engageable with mating surfaces on the bridge section 18 to prevent any substantial circumferential movement of the brake pad assembly relative to the disc. They also prevent rotational movement of piston 32 in cylinder 26 due to the connection between the recesses 44 and buttons 46. Breather passages 52 extend through piston head 34, opening through recesses 44. The brake shoe 48 protects these passages against dirt and splash. The passages allow air to move in the adjusting chamber 54 formed with the inner end of outer piston 32 adjacent the end wall 34.

An inner piston 56 is also generally cup-shaped and is telescopically and reciprocably received with the cylinder 38 formed by the outer piston skirt 36. The inner piston has a radially extending annular center portion 58. A skirt section 60 extends toward outer piston head 34 and terminates with a grooved land 62 in which a piston seal 64 is mounted. Seal 64 effectively seals inner piston 56 in relation to cylinder 38 and prevents hydraulic brake apply pressure from entering chamber 54. A cup-like piston end 66 extends from the inner annulus of piston portion 58 in the axially opposite direction from piston portion 58 relative to skirt 60. It is smaller in diameter than skirt 60. End 66 has a cylindrical portion 68 closed at its outer end by wall 70. The piston end 66 extends into and is radially inwardly spaced from the surface of aperture 72 formed in the actuating cylinder end wall 30. Keys 74 are formed on the inner annulus of the piston portion 58 and extend radially inwardly therefrom. The inner face 75 of portion 58 provides a clutch face, and the outer face 78 provides ball ramp surfaces which form a part of the ball ramp actuating mechanism to be described.

A support member 80 is either integrally formed with or fixedly secured to the outer piston end wall 34 so that it extends axially into the inner piston 56 and terminates close to the inner piston wall 70. Support member 80 receives and guides said inner piston. It is a bolt having external threads 82 formed thereon and axially extending keyways 84. Keyways 84 are formed through threads 82 from the support member end 86 to a point axially spaced from the piston head 34. Thus the keyways cause threads 82 to be circumferentially interrupted for a measured portion of the length of support member 80, while permitting some of the threads 82, located near piston end wall 34, to be uninterrupted. The keys 74 of inner piston 56 fit in keyways 84 to permit sliding movement of piston 56 relative to outer piston 32 while preventing relative rotational movement therebetween.

The mechanical actuating mechanism includes an actuator 88. This is a generally cup-shaped member with a radially extending flange 90 positioned adjacent the open end of the cupped portion, and a threaded extension 92 extending from the base 94 of the cupped portion. The flange 90 has ball ramp surfaces 96 formed on one side thereof and facing the ball ramp surfaces 98 formed on the inner piston portion 58. The other side of flange 90 provides a thrust surface 100 which engages a thrust washer 102 positioned against the end wall 30 of the cylinder 26. The cup portion of actuator 88 extends through aperture 72 and is sealingly and rotatably mounted in that aperture. A seal 104 provides the necessary sealing action. The threaded extension 92 extends exteriorly of aperture 72 and has a brake actuating lever arm 106 secured thereto by the nut and washer assembly 108. Arm 106 is so attached by threaded extension 92 that any arcuate movement of the arm about the axis of the threaded extension is reflected in arcuate movement of the actuator 88. The cylindrical portion 68 of inner piston 56 extends into the recess 110 formed by the cup-like portion of actuator 88, thereby piloting the inner piston for reciprocable movement along its axis.

The ball ramp actuating mechanism 112 is positioned between ball ramp surfaces 96 and 98 and includes a plurality of balls 114 located in the depressions formed by the ramp surfaces 96 and 98. The balls are so circumferentially spaced by a ball cage or separator 116 that they evenly transmit the required axial forces for brake operation. As better seen in FIG. 3, the ramp surfaces 96 and 98 are formed as the bottoms of depressions in the adjacent faces of the inner piston portion 58 and the actuator flange 90. The balls 114 keep the actuator flange 90 and the piston portion 58 spaced apart axially. Rotation of the actuator 88 in a brake applying direction causes movement of the actuator so that the balls 114 roll up the ramps and force inner piston 56 leftwardly as seen in FIGS. 1 and 3. Rotation of the actuator 88 in the opposite direction permits the inner piston 56 to return to the position shown in FIG. 3 in which the balls 114 rest in the deeper depression ends of the ball ramp surfaces.

An adjusting nut 118 is threaded on support member 80 and is located in adjusting chamber 54 between the inner and outer pistons. Nut 118 has a generally cylindrical body 120 with a radially outwardly extending flange 122 being provided on the end of the body adjacent the inner piston 56. Flange 122 therefore provides a clutch face 124 which is axially immediately adjacent clutch face 75 of inner piston 56. A clutch friction surface 126 may be located between the clutch face and secured to one of them. The nut internal threads 128 which mate with threads 82 of support member 80 extend through the nut.

A spring motor is provided by a torsion spring 130 having one end 132 secured to the adjusting nut 118 and the other end 134 extending into a slot 136 formed in the inner surface of land 62 of inner piston 56. The spring end 134 can therefore slide axially in slot 136 without being disengaged. The spring end 132 preferably extends into a passage, drilled radially in the end of nut 118, to prevent any movement of that spring end. The coils 138 of spring 130 extend circumferentially about the nut body 120 and are sufficiently spaced radially therefrom to prevent a clutch type engagement when the spring is tightly wound.

When the brake assembly is operated hydraulically, pressurized brake fluid is introduced into the hydraulic chamber 42 and acts against outer piston 32 and inner piston 56. It immediately moves inner piston 56 leftwardly to tightly frictionally engage the clutch formed by clutch faces 75 and 124 and clutch friction surface 126. The axial force is then transmitted through the adjusting nut, and by locking action of the cooperating threads 82 and 128, to the support member and outer piston 32. The force generated by hydraulic pressure acting directly on outer piston 32 and the force from the inner piston are applied to the brake pad assembly 24 to cause the lining 140 of that pad to frictionally engage the disc 20. The amount of leftward movement needed for this purpose appears as an increase in the axial distance between the facing surfaces of inner piston portion 58 and actuator flange 90. Hydraulic reaction acting on the end wall 30 of cylinder 26 moves the caliper frame 12 rightwardly as seen in FIG. 1, causing the lining 142 of brake pad assembly 22 to engage the other side of disc 20 in friction braking relation. This distance is similarly reflected in the space between piston portion 58 and actuator flange 90. The decrease in volume of adjusting chamber 54 causes some of the air trapped therein to move outwardly through breather passages 52, thereby preventing any pressure build-up in this chamber. This also occurs if pressure would otherwise tend to increase in the chamber due to heat during braking.

Upon brake release, the inner piston 56 will move rightwardly, disengaging the clutch faces 75 and 124. This rightward movement may occur by spring action of the end 134 of torsion spring 130 as it is engaged by the end of slot 132 and is tilted, or by a separate spreading spring 144 which may be provided between the end wall of the outer piston 32 and the land 62 of the inner piston. As the clutch faces 75 and 124 separate axially, an adjustment space is provided. This permits the spring motor torsion spring 130 to rotate the adjusting nut slightly so that the threading action causes the adjusting nut to move rightwardly relative to support member 80 until the clutch faces are again engaged. The amount of this adjustment is limited by the amount of relative movement that has occurred between inner piston portion 58 and actuator flange 90. It can be seen that adjustment is prevented by a locking action of the device during hydraulic brake apply.

When the brake is operated as a parking brake, arm 106 is rotated by suitable operator controlled linkage to cause balls 114 to spread the inner piston portion 58 and the actuator flange 90 axially apart. This causes tight engagement of the clutch faces 75 and 124 and clutch friction surface 126, locking the adjusting nut 118 against movement as before. The force is then transmitted to the support member 80 and the outer piston 32. Movement of the outer piston leftwardly in response to this force causes engagement of the lining 140 with the disc 20. Reaction to this force is transmitted from actuator flange 90 to the end wall 30 of cylinder 26 through thrust washer 102. This causes the caliper frame 12 to move as before and engage the lining 142 of brake pad assembly 122 with the other side of the disc 20.

When the parking brake is released by arcuate movement of arm 106 in the other direction, the balls 114 roll back down the ramps 96 and 98 to the position shown in FIG. 3. This permits rightward movement of inner piston 56, releasing the clutch between that piston and adjusting nut 118. This permits brake adjustment as earlier described and to the extent needed. The axial mating relation of threads 82 and 128 may provide sufficient axial clearance to allow for normal shoe-to-disc disengagement so that the shoes are not kept adjusted into continuous engagement with the disc.

What is claimed is:

1. In a disc brake actuating and adjusting mechanism:

an actuating cylinder;

first and second cup-like brake actuatable pistons telescopically mounted in said cylinder for axial movement relative to said cylinder and each other with said first piston sealingly nested in said second piston, said first piston opening into said second piston to define therewith an adjusting chamber open to atmosphere;

an adjusting support member secured to one of said pistons and extending through said adjusting chamber and slidably and non-rotatably receiving the other of said pistons;

an adjusting nut threadedly mounted on said support member in said adjusting chamber axially intermediate the ends of said pistons for concurrent rotational and axial movement on said support member, said nut being engageable with the other of said pistons and during brake actuation adapted to be loaded in compressive force transmitting relation to lock against rotational and axial movement on said support member and to transmit brake actuating forces between said pistons through said support member torsional force means connecting said nut and one of said pistons and urging said nut to move axially on said support member in an axial direction tending to move said pistons in axially divergent directions when such relative piston movement is permitted;

means limiting movement relative to said cylinder of one of said pistons in a brake releasing direction by said torsional force means;

and means preventing rotational movement of said pistons relative to said cylinder.

2. A disc brake caliper assembly comprising:

a caliper having spaced legs joined by a bridge section, one of said legs having a cylinder formed therein, said cylinder opening toward said other leg and being defined by a cylindrical wall and an end wall, said end wall having an aperture therethrough;

first and second cup-shaped pistons reciprocably and sealingly nested in said cylinder with said second piston in said first piston, said pistons opening toward each other, said first piston having means preventing its rotation in said cylinder;

an extension on said first piston receiving and guiding said second piston in axially sliding movement and preventing relative rotational movement therebetween;

said second piston having a radially extending portion on one side of which is provided a first clutch face and on the other side of which is provided a first ball ramp surface;

an adjusting nut threaded for concurrent axial and rotational movement on said first piston extension axially intermediate said first clutch face and one end of said first piston and having a second clutch face thereon in mateable relation with said first clutch face;

a torsionally loaded spring engaging one of said pistons and said adjusting nut and continually urging said adjusting nut axially toward said first clutch face;

a ball ramp actuator rotatably mounted in said cylinder end wall aperture and having a second ball ramp surface thereon facing said first ball ramp surface in axially spaced relation, a thrust surface operatively engaging said end wall to transmit brake actuating thrust thereto, means attached to said actuator externally of said cylinder and aperture for mechanically rotating said actuator, and ball means between said ramp surfaces;

and fluid means in said cylinder for selectively exerting fluid pressure and urging said first and second pistons outwardly of said cylinder;

said first and second pistons being urged outwardly of said cylinder by either fluid pressure or ball ramp actuation to frictionally engage said clutch faces and prevent adjusting nut movement during brake actuation, said clutch faces tending to separate upon brake release when brake wear has occurred, said spring rotating and axially moving said adjusting nut toward said first clutch face upon brake wear and brake release to maintain said clutch faces in engagement and adjust the brake assembly.

* * * * *